US012615122B2

(12) United States Patent
Xiang et al.

(10) Patent No.: US 12,615,122 B2
(45) Date of Patent: Apr. 28, 2026

(54) SYSTEM INFORMATION BLOCK TRANSMISSION METHOD AND COMMUNICATION APPARATUS

(71) Applicant: HUAWEI TECHNOLOGIES CO., LTD., Guangdong (CN)

(72) Inventors: Hongyu Xiang, Beijing (CN); Lei Chen, Beijing (CN); Bingzhao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 310 days.

(21) Appl. No.: 18/331,113

(22) Filed: Jun. 7, 2023

(65) Prior Publication Data

US 2023/0318791 A1      Oct. 5, 2023

Related U.S. Application Data

(63) Continuation of application No. PCT/CN2020/134591, filed on Dec. 8, 2020.

(51) Int. Cl.
*H04L 5/00* (2006.01)
*H04W 72/0453* (2023.01)

(52) U.S. Cl.
CPC ....... *H04L 5/0053* (2013.01); *H04W 72/0453* (2013.01)

(58) Field of Classification Search
CPC ............ H04L 5/0053; H04W 72/0453; H04W 72/23; H04W 48/12; H04W 4/06;
(Continued)

(56) References Cited

U.S. PATENT DOCUMENTS

| | | | | |
|---|---|---|---|---|
| 10,904,910 B2 * | 1/2021 | Chen | ..................... | H04W 72/23 |
| 11,617,128 B2 * | 3/2023 | Rune | ..................... | H04W 48/10 |
| | | | | 370/328 |

(Continued)

FOREIGN PATENT DOCUMENTS

| | | |
|---|---|---|
| CN | 101686580 A | 3/2010 |
| CN | 110337078 A | 10/2019 |

(Continued)

OTHER PUBLICATIONS

Huawei et al: "Discussion on related aspects of system information for V2X", 3GPP Draft; R2-1913706, Oct. 4, 2019, XP051791698, total 4 pages.

(Continued)

*Primary Examiner* — Brian T O Connor

(57) ABSTRACT

System information block transmission methods and communication apparatus are provided to resolve a problem that a terminal device cannot receive, on an active bandwidth part, a system information block broadcast by a network device. A network device sends a system information block to a terminal device through a first bandwidth part. When determining that a first moment satisfies a preset condition, the network device sends the system information block to the terminal device through a second bandwidth part, where the system information block is included in first dedicated signaling, and configuration information for sending the system information block by the network device is not configured on the second bandwidth part.

16 Claims, 4 Drawing Sheets

201. Send a SIB1 through a first bandwidth part

202. Store a system information block, and start a timer

203. Send first dedicated signaling including the SIB1 at a first moment through a second bandwidth part

(58) Field of Classification Search
CPC ....... H04W 76/40; H04W 48/10; H04W 4/90;
H04W 76/27
See application file for complete search history.

(56) References Cited

U.S. PATENT DOCUMENTS

| | | | | |
|---|---|---|---|---|
| 11,849,499 | B2 * | 12/2023 | Shih | H04W 72/231 |
| 12,177,839 | B2 * | 12/2024 | Chen | H04W 72/1273 |
| 12,326,510 | B2 * | 6/2025 | Shreevastav | H04W 4/20 |
| 2019/0053029 | A1 * | 2/2019 | Agiwal | H04W 76/27 |
| 2019/0223086 | A1 * | 7/2019 | Jung | H04W 76/11 |
| 2020/0146100 | A1 | 5/2020 | Lee et al. | |
| 2021/0136661 | A1 * | 5/2021 | Frenger | H04W 48/14 |
| 2021/0385790 | A1 * | 12/2021 | Jung | H04W 76/27 |
| 2022/0141756 | A1 * | 5/2022 | Pan | H04W 48/12 |
| | | | | 370/328 |
| 2022/0317234 | A1 * | 10/2022 | Shreevastav | G01S 19/05 |
| 2023/0108837 | A1 * | 4/2023 | Chen | H04W 72/23 |
| | | | | 370/329 |
| 2023/0300790 | A1 * | 9/2023 | Jung | H04W 76/28 |
| | | | | 370/329 |
| 2024/0422856 | A1 * | 12/2024 | Lauridsen | H04W 76/27 |

FOREIGN PATENT DOCUMENTS

| | | | |
|---|---|---|---|
| WO | 2019031913 | A1 | 2/2019 |
| WO | 2019196933 | A1 | 10/2019 |

OTHER PUBLICATIONS

Huawei et al: "Discussions on SI change in RRC_Connected state", 3GPP Draft; R2-1910406,Aug. 16, 2019, XP051768185, total 4 pages.
Huawei et al: "Further discussions on on-demand SI in RRC_Conected", 3GPP Draft R2-1913042, Oct. 3, 2019, XP051791063, total 5 pages.
Huawei et al, "R2-1913042 Further discussions on on-demand SI in RRC_Conected", 3GPP TSG-RAN WG2 Meeting #107bis, Oct. 18, 2019, total 5 pages.
Spreadtrum Communications, "R1-1808805 Remaining issues on bandwidth parts and carrier aggregation", 3GPP TSG RAN WG1#94, Aug. 24, 2018, total 3 pages.
OPPO, "R2-1806874 BWP inactivity timer behaviour on SI acquisition", 3GPP TSG-RAN2 #102, May 25, 2018, total 2 pages.
3GPP TS 38.304 V16.2.0:"3rd Generation Partnership Project; Technical Specification Group Radio Access Network; NR;User Equipment (UE) procedures in Idle mode and RRC Inactive state(Release 16)",Sep. 2020,total 39 pages.

* cited by examiner

SYSTEM INFORMATION BLOCK TRANSMISSION METHOD AND COMMUNICATION APPARATUS

CROSS-REFERENCE TO RELATED APPLICATIONS

This application is a continuation of International Application No. PCT/CN2020/134591 filed on Dec. 8, 2020, the disclosure of which is hereby incorporated by reference in its entirety.

TECHNICAL FIELD

This disclosure relates to the field of communication technologies, and in particular, to a system information block transmission method and a communication apparatus.

BACKGROUND

In a mobile communication system, for example, a new radio (NR) system or a long term evolution (LTE) system, after achieving downlink synchronization with a cell through cell search, a terminal device needs to obtain system information (SI) of the cell, to access the cell and work normally in the cell.

The system information mainly includes a master information block (MIB), a system information block (SIB), and the like. For example, the NR system defines 14 types of SIBs: from a SIB type (type) 1 to a SIB type 14, which are respectively referred to as a SIB1, a SIB2, . . . , and a SIB14 for short. The SIBs other than the SIB1 are also referred to as other system information (OSI).

When the terminal device is in a radio resource control (RRC) non-connected state, the terminal device is scheduled to work on an initial bandwidth part, and the terminal device may receive, on the initial bandwidth part, a SIB1 broadcast by a network device. When the terminal device is in an RRC connected state, the terminal device is scheduled to work on an active bandwidth part, and the terminal device may not receive, on the active bandwidth part, the SIB1 broadcast by the network device, and cannot work normally in a current cell. Consequently, communication reliability is reduced.

SUMMARY

This disclosure provides a system information block transmission method and a communication apparatus, to resolve a problem that a terminal device cannot receive, on an active bandwidth part, a system information block broadcast by a network device.

According to a first aspect, a system information block transmission method includes a network device that sends a system information block to a terminal device through a first bandwidth part. When determining that a first moment satisfying a preset condition is reached, the network device sends the system information block to the terminal device at the first moment through a second bandwidth part. The system information block is included in first dedicated signaling, and configuration information for sending the system information block by the network device is not configured on the second bandwidth part.

In the foregoing technical solution, the configuration information for sending the system information block by the network device is not configured on the second bandwidth part, and when working on the second bandwidth part, the terminal device cannot receive a system information block broadcast by the network device. The network device sends the system information block to the terminal device by using dedicated signaling at a first moment before the system information block in the terminal device expires, and the terminal device obtains the system information block from the dedicated signaling, so as to periodically update the stored system information block. This avoids a problem that the terminal device deletes the system information block and cannot obtain a new system information block after valid duration of the system information block in the terminal device expires, resulting in that the terminal device cannot work normally in a current cell, thereby improving communication reliability.

In a possible implementation, that the network device determines that a first moment satisfying a preset condition is reached includes receipt by network device of first indication information from a terminal device, the first indication information indicating that a system information block stored in the terminal device is about to expire. The network device determines the first moment based on the first indication information.

In the foregoing technical solution, the terminal device maintains a timer for determining duration of a stored system information block in the terminal device. If the terminal device cannot receive, through the second bandwidth part, a system information block broadcast by the network device, the terminal device sends the first indication information to the network device when the duration reaches specified duration of the timer. The network device determines, based on the first indication information, to immediately send first dedicated signaling including the system information block to the terminal device. The terminal device receives the first dedicated signaling, and obtains the system information block from the first dedicated signaling, so as to periodically update the stored system information block.

In a possible implementation, that the network device determines that a first moment satisfying a preset condition is reached includes the network device receives second indication information from a terminal device. The second indication information includes a second moment, and the second moment is an expiration moment of a system information block stored in the terminal device. The network device determines the first moment based on the second indication information, and the first moment is before the second moment.

In the foregoing technical solution, the terminal device may determine to send the second indication information to the network device at any moment before the duration of the stored system information block reaches valid duration. For example, when determining that the duration of the stored system information block reaches the specified duration of the timer, or the first bandwidth part is switched to the second bandwidth part, or a service busy rate is less than a busy rate threshold, correspondingly, the network device may also determine, based on the expiration moment in the second indication information, to send the first dedicated signaling including the system information block to the terminal device at any moment before the duration reaches the valid duration, thereby improving flexibility for the terminal device to obtain the system information block while ensuring that the terminal device periodically updates the stored system information block.

In a possible implementation, that the network device determines that a first moment satisfying a preset condition is reached includes: The network device starts timing for specified duration from a moment at which the network device establishes an RRC connection to the terminal device. The first moment is not earlier than a moment at which the specified duration expires.

In a possible implementation, that the network device determines that a first moment satisfying a preset condition is reached includes: The network device starts timing for specified duration from a moment at which the network device sends the system information block to the terminal device through second dedicated signaling. The first moment is not earlier than a moment at which the specified duration expires.

In the foregoing technical solution, if determining that the terminal device cannot receive the system information block through the second bandwidth part, the network device actively maintains the timer to determine the duration of the stored system information block in the terminal device. When determining that the duration reaches the specified duration, the network device sends the first dedicated signaling including the system information block to the terminal device, and the terminal device receives the first dedicated signaling and obtains the system information block from the first dedicated signaling, so as to periodically update the stored system information block. Further, the terminal device does not need to determine whether broadcast of the network device may be received, or the terminal device does not need to start a timer, thereby reducing complexity of the terminal device.

In a possible implementation, that configuration information for sending the system information block by the network device is not configured on the second bandwidth part includes: The configuration information for sending the system information block by the network device includes a frequency domain resource for broadcasting the system information block by the network device, and the second bandwidth part does not include the frequency domain resource. In the foregoing technical solution, on the premise that it is ensured that a valid system information block is stored in the terminal device, the network device may schedule the terminal device to a dedicated bandwidth part, and the terminal device implements data transmission on the dedicated bandwidth part, which facilitates proper allocation of resources in the cell.

In a possible implementation, the second bandwidth part does not carry a system information block periodically broadcast by the network device. Optionally, the second bandwidth part is the same as the first bandwidth part. In the foregoing technical solution, on the premise that it is ensured that a valid system information block is stored in the terminal device, the network device does not need to periodically broadcast the system information block, thereby effectively reducing consumption of the network device.

According to a second aspect, a system information block transmission method provides for receipt by a terminal device of a system information block from a network device through a first bandwidth part. The terminal device stores the system information block and starts a timer. Timing duration of the timer is for a specified duration. When timing of the timer expires, the terminal device receives a system information block from the network device through a second bandwidth part, the system information block received through the second bandwidth part is included in first dedicated signaling. Configuration information for sending the system information block by the network device is not configured on the second bandwidth part.

In the foregoing technical solution, after receiving the system information block of the network device, the terminal device may start the timer to determine duration of the current stored system information block. If the terminal device cannot receive, through the second bandwidth part, the system information block broadcast by the network device, when the duration reaches the specified duration of the timer (that is, timing of the timer reaches the specified duration), the first dedicated signaling including the system information block from the network device is received through the second bandwidth part. This avoids a problem that the terminal device deletes the system information block and cannot obtain a new system information block, resulting in that the terminal device cannot work normally in a current cell, thereby improving communication reliability.

In a possible implementation, the method further provides that the terminal device sends first indication information to the network device when timing of the timer expires. The first indication information indicates that the system information block stored in the terminal device is about to expire.

In the foregoing technical solution, if the terminal device cannot receive, through the second bandwidth part, the system information block broadcast by the network device, the terminal device sends the first indication information to the network device when duration, determined based on the timer, of the stored system information block in the terminal device reaches the specified duration, and the network device determines immediately to send the first dedicated signaling including the system information block to the terminal device based on the first indication information. The terminal device receives the first dedicated signaling and obtains the system information block from the first dedicated signaling, so as to periodically update the stored system information block.

In a possible implementation, the method further includes: The terminal device sends second indication information to the network device when the timer expires. The second indication information includes a second moment, and the second moment is an expiration moment of the system information block stored in the terminal device.

In the foregoing technical solution, the terminal device may determine to send the second indication information to the network device at any moment before the duration of the stored system information block reaches valid duration. For example, when determining that the duration of the stored system information block reaches the specified duration of the timer, or the first bandwidth part is switched to the second bandwidth part, or a service busy rate is less than a busy rate threshold, correspondingly, the network device may also determine, based on the expiration moment in the second indication information, to send the first dedicated signaling including the system information block to the terminal device at any moment before the duration reaches the valid duration, thereby improving flexibility for the terminal device to obtain the system information block while ensuring that the terminal device periodically updates the stored system information block.

In a possible implementation, that configuration information for sending the system information block by the network device is not configured on the second bandwidth part includes: The configuration information for sending the system information block by the network device includes a frequency domain resource for broadcasting the system information block by the network device, and the second bandwidth part does not include the frequency domain resource. In the foregoing technical solution, on the premise that it is ensured that a valid system information block is stored in the terminal device, the network device may schedule the terminal device to a dedicated bandwidth part, and the terminal device implements data transmission on the dedicated bandwidth part, which facilitates proper allocation of resources in the cell.

In a possible implementation, the second bandwidth part does not carry a system information block periodically broadcast by the network device. Optionally, the second bandwidth part is the same as the first bandwidth part. In the foregoing technical solution, on the premise that it is ensured that a valid system information block is stored in the terminal device, the network device does not need to periodically broadcast the system information block, thereby effectively reducing consumption of the network device.

According to a third aspect, a system information block transmission method provides:

A terminal device receives a system information block from a network device through a first bandwidth part. The terminal device stores a system information block, and starts a first timer. Timing duration of the first timer is specified duration. When timing of the first timer expires, if the terminal device does not receive the system information block from the network device on the second bandwidth part, the terminal device continues to use the stored system information block. Configuration information for sending the system information block by the network device is not configured on the second bandwidth part.

In the foregoing technical solution, after receiving the system information block of the network device, the terminal device may start the timer to determine duration of a current stored system information block. If the terminal device determines that the system information block cannot be received through the second bandwidth part, when the duration of the system information block stored in the terminal device reaches the valid duration, the terminal device continues to use the stored system information block until an updated system information block sent by the network device through the first dedicated signaling is received. This avoids a problem that the terminal device deletes the system information block and cannot obtain a new system information block, resulting in that the terminal device cannot work normally in a current cell, thereby improving communication reliability.

In a possible implementation, that the terminal device continues to use the stored system information block includes: The terminal device prolongs valid duration of the stored system information block, or the terminal device restarts the first timer, or the terminal device starts a second timer. Timing duration of the second timer is different from that of the first timer.

In a possible implementation, that configuration information for sending the system information block by the network device is not configured on the second bandwidth part includes: The configuration information for sending the system information block by the network device includes a frequency domain resource for broadcasting the system information block by the network device, and the second bandwidth part does not include the frequency domain resource. In the foregoing technical solution, on the premise that it is ensured that a valid system information block is stored in the terminal device, the network device may schedule the terminal device to a dedicated bandwidth part, and the terminal device implements data transmission on the dedicated bandwidth part, which facilitates proper allocation of resources in the cell.

In a possible implementation, the second bandwidth part does not carry a system information block periodically broadcast by the network device. Optionally, the second bandwidth part is the same as the first bandwidth part. In the foregoing technical solution, on the premise that it is ensured that a valid system information block is stored in the terminal device, the network device does not need to periodically broadcast the system information block, thereby effectively reducing consumption of the network device.

According to a fourth aspect, an embodiment provides a communication apparatus, including a processing module and a transceiver module.

In a possible implementation, the processing module is configured to control the transceiver module to send a system information block to a terminal device through the first bandwidth part. The processing module is further configured to: when determining that a first moment satisfying a preset condition is reached, control the transceiver module to send the system information block to the terminal device at the first moment through a second bandwidth part. The system information block is included in first dedicated signaling, and configuration information for sending the system information block by the network device is not configured on the second bandwidth part.

In a possible implementation, the processing module is configured to control the transceiver module to receive first indication information from the terminal device, and the first indication information indicates that the system information block stored in the terminal device is about to expire. The processing module is configured to determine the first moment based on the first indication information.

In a possible implementation, the processing module is configured to control the transceiver module to receive second indication information from the terminal device. The second indication information includes a second moment, and the second moment is an expiration moment of a system information block stored in the terminal device. The processing module is configured to determine the first moment based on the second indication information, and the first moment is before the second moment.

In a possible implementation, the processing module is configured to start timing for specified duration from a moment at which the communication apparatus establishes an RRC connection to the terminal device. The first moment is not earlier than a moment at which the specified duration expires.

In a possible implementation, the processing module is configured to start timing the specified duration from a moment at which the communication apparatus sends the system information block to the terminal device through second dedicated signaling. The first moment is not earlier than a moment at which the specified duration expires.

In a possible implementation, that the processing module controls the transceiver module to send configuration information of the system information block includes a frequency domain resource for broadcasting the system information block by the transceiver module, and the second bandwidth part does not include the frequency domain resource.

In a possible implementation, the second bandwidth part does not carry a system information block periodically broadcast by the network device. Optionally, the second bandwidth part is the same as the first bandwidth part.

According to a fifth aspect, an embodiment provides a communication apparatus, including a processing module and a transceiver module.

In a possible implementation, the processing module is configured to control the transceiver module to receive the system information block from the network device through the first bandwidth part. The processing module is further configured to store the system information block, and start a timer. Timing duration of the timer is specified duration.

The processing module is further configured to control the transceiver module to receive the system information block from the network device through the second bandwidth part when timing of the timer expires. The system information block received through the second bandwidth part is included in first dedicated signaling, and configuration information for sending the system information block by the network device is not configured on the second bandwidth part.

In a possible implementation, the processing module is further configured to control the transceiver module to send first indication information to the network device when timing of the timer expires. The first indication information indicates that the system information block stored in the terminal device is about to expire.

In a possible implementation, the processing module is further configured to control the transceiver module to send second indication information to the network device when timing of the timer expires. The second indication information includes a second moment, and the second moment is an expiration moment of the system information block stored in the terminal device.

In a possible implementation, that the processing module controls the transceiver module to send configuration information of the system information block includes a frequency domain resource for broadcasting the system information block by the transceiver module, and the second bandwidth part does not include the frequency domain resource.

In a possible implementation, the second bandwidth part does not carry a system information block periodically broadcast by the network device. Optionally, the second bandwidth part is the same as the first bandwidth part.

According to a sixth aspect, an embodiment provides a communication apparatus, including a processing module and a transceiver module.

In a possible implementation, the processing module is configured to control the transceiver module to receive the system information block from the network device through the first bandwidth part. The processing module is further configured to store the system information block, and start a first timer. Timing duration of the first timer is specified duration. The processing module is further configured to continue, if no system information block is received from the network device on the second bandwidth part when timing of the first timer expires, to use the stored system information block. Configuration information for sending the system information block by the network device is not configured on the second bandwidth part.

In a possible implementation, the processing module is configured to prolong valid duration of the stored system information block, or restart the first timer, or start a second timer. Timing duration of the second timer is different from that of the first timer.

In a possible implementation, that the processing module controls the transceiver module to send configuration information of the system information block includes a frequency domain resource for broadcasting the system information block by the transceiver module, and the second bandwidth part does not include the frequency domain resource.

In a possible implementation, the second bandwidth part does not carry a system information block periodically broadcast by the network device. Optionally, the second bandwidth part is the same as the first bandwidth part.

According to a seventh aspect, this application provides a communication apparatus, including a processor and a communication interface. The communication interface is configured to receive a signal from another communication apparatus other than the communication apparatus and transmit the signal to the processor, or send a signal from the processor to another communication apparatus other than the communication apparatus. The processor is configured to implement, by using a logic circuit or by executing code instructions, the method in the first aspect or any possible implementation of the first aspect, the method in the second aspect or any possible implementation of the second aspect, or the method in the third aspect or any possible implementation of the third aspect.

According to an eighth aspect, a computer-readable storage medium stores a computer program or instructions. When the computer program or the instructions are executed by a communication apparatus, the communication apparatus is enabled to implement the method in the first aspect or any possible implementation of the first aspect, or the method in the second aspect or any possible implementation of the second aspect, or the method in the third aspect or any possible implementation of the third aspect.

According to a ninth aspect, a computer program product includes a computer program or instructions. When the computer program or the instructions are executed by a communication apparatus, the communication apparatus is enabled to implement the method in the first aspect or any possible implementation of the first aspect, or the method in the second aspect or any possible implementation of the second aspect, or the method in the third aspect or any possible implementation of the third aspect.

According to a tenth aspect, a communication system, includes the communication apparatus in the fourth aspect or any possible implementation of the fourth aspect and the communication apparatus in the fifth aspect or any possible implementation of the fifth aspect, or including the communication apparatus in the sixth aspect or any possible implementation of the sixth aspect.

According to an eleventh aspect, a chip includes at least one processor and an interface.

The interface is configured to provide program instructions or data for the at least one processor.

The at least one processor is configured to execute the program instructions, to implement the method in the first aspect or any possible implementation of the first aspect, or implement the method in the second aspect or any possible implementation of the second aspect, or the method in the third aspect or any possible implementation of the third aspect.

For technical effects that can be achieved in any one of the fourth aspect to the eleventh aspect, refer to descriptions of beneficial effects in the first aspect to the third aspect. Details are not described herein again.

DESCRIPTION OF EMBODIMENTS

The following describes embodiments in detail with reference to the accompanying drawings.

A method provided in this application may be applied to a fifth generation (5G) communication system, or may be further applied to a new communication system emerging in future communication development.

Figure 1:
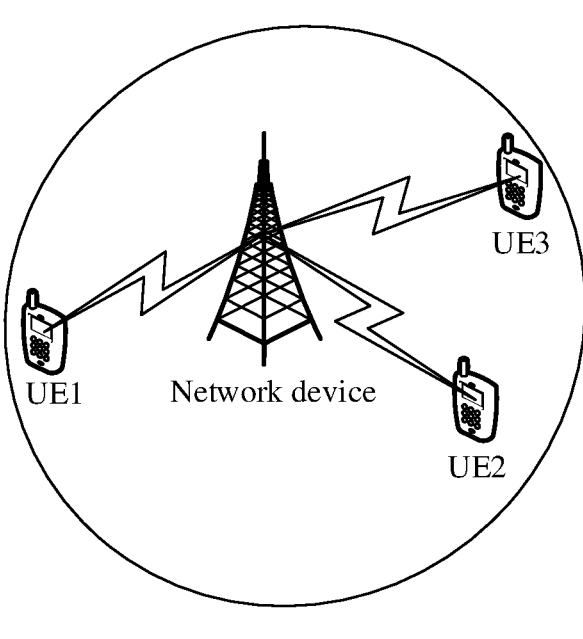
FIG. 1 is a schematic diagram of an architecture of a communication system according to this disclosure.

For example, the method provided in embodiments of this disclosure may be applied to a communication system shown in FIG. 1. A network device and three terminal devices (respectively represented by UE1 to UE3) form a single-cell communication system. The UE1 to the UE3 may separately or simultaneously send uplink data to the network device, and the network device may separately or simultaneously send downlink data to the UE1 to the UE3. It should be understood that FIG. 1 is merely an example for description, and quantities of terminal devices, network devices, and cells covered by the network device that are included in the communication system are not specifically limited herein.

The terminal device involved in disclosed embodiments is an entity that is on a user side and that is configured to receive or transmit a signal. The terminal device may be a device that provides voice and/or data connectivity for a user, for example, a handheld device or an in-vehicle device with a wireless connection function. The terminal device may also be another processing device connected to a wireless modem. The terminal device may communicate with a radio access network (RAN). The terminal device may also be referred to as a wireless terminal, a subscriber unit, a subscriber station, a mobile station, a mobile, a remote station, an access point, a remote terminal, an access terminal, a user terminal, a user agent, a user device, user equipment (UE), or the like. A common terminal device includes, for example, a mobile phone, a tablet computer, a notebook computer, a palmtop computer, a mobile Internet device (MID), a video surveillance device, and a wearable device such as a smartwatch, a smart band, or a pedometer. However, this is not limited in embodiments of this disclosure.

The network device operating in various of the disclosed embodiments is an entity that is on a network side that is configured to transmit or receive a signal, and may be configured to mutually convert a received over-the-air frame and an Internet Protocol (IP) packet, and serve as a router between the terminal device and a remaining part of the access network, where the remaining part of the access network may include an IP network. The network device may further coordinate attribute management of an air interface. For example, the network device may be a new radio controller (NR controller), a gNodeB (gNB) in a 5G system, a centralized unit, a new radio base station, a remote radio module, a micro base station, a relay, a distributed unit, a transmission reception point (TRP), a transmission point (TP), or any other wireless access device. However, this is not limited in embodiments of this application. The network device may cover one or more cells.

A network architecture and a service scenario described in embodiments of this application are intended to describe the technical solutions in embodiments of this application more clearly, but do not constitute a limitation on the technical solutions provided in embodiments of this application. A person of ordinary skill in the art may learn that with evolution of the network architecture and emergence of a new service scenario, the technical solutions provided in embodiments of this application are further applicable to similar technical problems.

A bandwidth part (BWP) may be configured in the 5G system, and the network device may flexibly adjust bandwidth based on a service data volume of the terminal device, to reduce power consumption of the terminal device.

When the terminal device is in an RRC non-connected state, the network device configures an initial bandwidth part (initial BWP) for the terminal device, where the initial bandwidth part includes a frequency domain resource for broadcasting a SIB1 by the network device. The terminal device performs downlink synchronization with a cell on the initial bandwidth part through cell search to obtain a physical cell identifier (PCI) of the cell. The terminal device parses, based on the PCI of the cell, a master information block (MIB) carried on a physical broadcast channel (PBCH), and then further obtains a transmission resource of the SIB1 based on the MIB. The terminal device receives the SIB1 on the transmission resource of the SIB1, where the SIB1 is used as a cell-specific SIB message and includes scheduling information of OSI. The terminal device accesses, based on the SIB of the cell, the cell and works in the cell.

When the terminal device is in an RRC connected state, the network device may configure a plurality of dedicated bandwidth parts (dedicated BWPs) for the terminal device. The network device may activate a dedicated bandwidth part (active bandwidth part (active BWP)) of the terminal device through a dynamic indication, and the terminal device works on the active bandwidth part. It should be noted that, in this application, when the terminal device is scheduled to a dedicated bandwidth part, the dedicated bandwidth part may also be referred to as an active bandwidth part.

The SIB1 stored in the terminal device has valid duration, which may be 3 hours. When duration of the SIB1 stored in the terminal device reaches the valid duration, the stored SIB1 is deleted, and a procedure of obtaining a new SIB1 is performed. In this case, if the active bandwidth part on which the terminal device works does not include the frequency domain resource for broadcasting the SIB1 by the network device, the terminal device cannot receive a SIB1 of a current cell broadcast by the network device. The terminal device mistakenly considers that the current cell is barred, and performs a cell reselection process.

Based on this, this application provides a system information block transmission method. When the terminal device cannot obtain a system information block broadcast by the network device, the terminal device obtains the system information block by using dedicated signaling, thereby avoiding a problem that the terminal device mistakenly considers that a current cell is barred and performs a cell reselection process.

In this application, the system information block may be a SIB1 or OSI. The OSI is, for example, any one of SIB2, . . . , and SIB14. For ease of description, description is given below by using an example in which the system information block is the SIB1.

Figure 2:
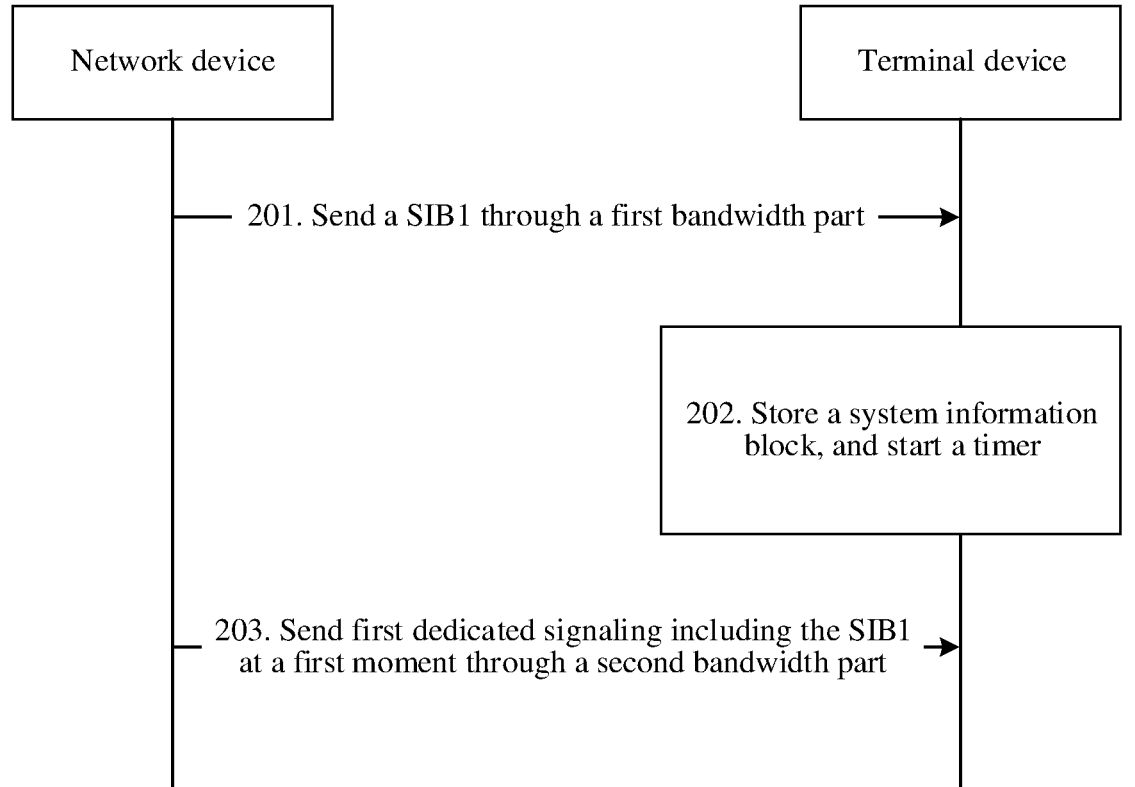
FIG. 2 is a schematic flowchart of a SIB1 transmission method according to this disclosure.

FIG. 2 is a schematic flowchart of an example of a SIB1 transmission method according to this application. A procedure is as follows:

Step 201. A network device sends a SIB1 to a terminal device through a first bandwidth part.

Correspondingly, the terminal device receives the SIB1 from the network device through the first bandwidth part.

Configuration information for sending the SIB1 by the network device is configured on the first bandwidth part. When working on the first bandwidth part, the terminal device may receive the SIB1 from the network device. The first bandwidth part may be an initial bandwidth part configured by the network device for the terminal device, or may be a dedicated bandwidth part configured by the network device for the terminal device.

In a specific implementation, the first bandwidth part includes a frequency domain resource for broadcasting the SIB1 by the network device, and the terminal device receives, through the first bandwidth part, the SIB1 broadcast by the network device. For example, the network device broadcasts an MIB, where the MIB indicates a common search space (CSS) and a control resource set (CORESET) 0. The terminal device determines, based on the common search space and the control resource set 0 in the MIB, a physical downlink control channel (PDCCH) resource used by the network device to send scheduling information of the SIB1, receives, on the PDCCH resource, the scheduling information of the SIB1 broadcast by the network device, and determines, based on the scheduling information of the SIB1, a physical downlink shared channel (physical downlink shared channel, PDSCH) resource for broadcasting the SIB1 by the network device. The terminal device receives, on the PDSCH resource, the SIB1 broadcast by the network device. Step 202. The terminal device stores a system information block, and starts a timer.

The SIB1 has corresponding valid duration, and the valid duration may be 3 h or another value. Duration of the SIB1 stored in the terminal device does not exceed the valid duration corresponding to the SIB1. Further, the timer started by the terminal device is configured to determine duration of the SIB1 stored in the terminal device. Timing duration of the timer is specified duration, and the specified duration is less than the valid duration corresponding to the SIB1. For example, after receiving the SIB1 through the first bandwidth part, the terminal device may start a timer to determine duration of the SIB1 stored in the terminal device. Timing duration of the timer is, for example, 2.9 h.

Step 203. When determining that a first moment satisfying a preset condition is reached, the network device sends first dedicated signaling including the SIB1 to the terminal device at the first moment through a second bandwidth part. The first moment is not earlier than a moment at which the specified duration expires.

The terminal device works on the second bandwidth part at the first moment. The second bandwidth part may be a dedicated bandwidth part configured by the network device for the terminal device. It should be understood that when the terminal device works on the second bandwidth part, the second bandwidth part is activated, and the second bandwidth part may be referred to as an active bandwidth part. If the configuration information for sending the SIB1 by the network device is not configured on the second bandwidth part, the terminal device cannot receive, through the second bandwidth part, the SIB1 broadcast by the network device. Specifically, the following two cases are used:

Case 1: The second bandwidth part and the first bandwidth part are different bandwidth parts.

In a first example, the first bandwidth part is an initial bandwidth part configured by the network device for the terminal device, and the second bandwidth part is a dedicated bandwidth part configured by the network device for the terminal device. When the terminal device is in the RRC non-connected state, the network device may configure an initial bandwidth part for the terminal device. The terminal device establishes an RRC connection to the network device through the initial bandwidth part. Then, the network device schedules the terminal device from the initial bandwidth part to the active bandwidth part.

In a second example, the first bandwidth part is a dedicated bandwidth part configured by the network device for the terminal device, and the second bandwidth part is another dedicated bandwidth part configured by the network device for the terminal device. The network device may schedule the terminal device from one dedicated bandwidth part to another dedicated bandwidth part.

In the second example, the first bandwidth part and the second bandwidth part may be indicated by using an identity (ID). The network device configures four dedicated bandwidth parts for the terminal device, respectively corresponding to IDs, namely, BWP0 to BWP3. For example, the terminal device works on a dedicated bandwidth part corresponding to the BWP3, and then receives switching information from the network device. The switching information may include the BWP 1, and indicates the terminal device to switch from the dedicated bandwidth part corresponding to the BWP3 to a dedicated bandwidth part corresponding to the BWP1. In this case, the dedicated bandwidth part corresponding to the BWP3 is the first bandwidth part, and the dedicated bandwidth part corresponding to the BWP1 is the second bandwidth part.

In Case 1, a frequency domain resource and/or time domain resource for broadcasting the SIB1 by the network device are/is not configured on the second bandwidth part.

If the frequency domain resource for broadcasting the SIB1 by the network device is not configured on the second bandwidth part, in other words, the second bandwidth part does not include the frequency domain resource for broadcasting the SIB1 by the network device, although the network device may broadcast the SIB1, the SIB1 broadcast by the network device cannot be received because the terminal device works on the second bandwidth part.

If the time domain resource for broadcasting the SIB1 by the network device is not configured on the second bandwidth part, although the second bandwidth part may include the frequency domain resource for broadcasting the SIB1 by the network device, the terminal device cannot receive the SIB1 broadcast by the network device because the network device no longer periodically broadcasts the SIB1 in consideration of energy saving.

If the time domain resource and frequency domain resource for broadcasting the SIB1 by the network device are not configured on the second bandwidth part, the terminal device cannot receive the SIB1 broadcast by the network device. For details, refer to the description.

Case 2: The first bandwidth part and the second bandwidth part are a same bandwidth part.

It is equivalent to that the time domain resource for broadcasting the SIB1 by the network device is not configured on the second bandwidth part in Case 1, Case 2 is explained as follows: The terminal device always works on the first bandwidth part, and the first bandwidth part includes the frequency domain resource for broadcasting the SIB1 by the network device. However, after the network device sends the SIB1 to the terminal device through the first bandwidth part, the network device no longer periodically broadcasts the SIB1 for a consideration of energy saving, and therefore the terminal device cannot receive the SIB1 broadcast by the network device.

To prevent the terminal device from deleting the stored SIB1 after the duration of the stored SIB1 reaches the valid duration, the network device may, send first dedicated signaling to the terminal device in a unicast manner on the second bandwidth part before the duration of the SIB1 stored in the terminal device reaches the valid duration. The first dedicated signaling includes the SIB1. A parameter of the SIB1 in the first dedicated signaling may be the same as or different from a parameter of the SIB1 currently stored in the terminal device.

For example, the first dedicated signaling may be RRC dedicated signaling in a connection control process, for example, RRC reconfiguration, RRC connection establishment, RRC connection resume, or RRC connection re-establishment.

In the foregoing technical solution, the configuration information for sending the SIB1 by the network device is not configured on the second bandwidth part, and when working on the second bandwidth part, the terminal device cannot receive the SIB1 broadcast by the network device. The network device sends the SIB1 to the terminal device by using dedicated signaling at a first moment before the SIB1 in the terminal device expires, and the terminal device obtains the SIB1 from the dedicated signaling, so as to periodically update the stored SIB1. This avoids a problem that the terminal device deletes the SIB1 and cannot obtain a new SIB1 after the valid duration of the SIB1 in the terminal device expires, resulting in that the terminal device cannot work normally in a current cell, thereby helping improve communication reliability.

Further, on the premise that it is ensured that the terminal device periodically updates the SIB1 in the terminal device, the network device may schedule the terminal device to the dedicated bandwidth part, and the terminal device implements data transmission on the dedicated bandwidth part, which facilitates proper allocation of resources in the cell. In addition, on the premise that it is ensured that the terminal device periodically updates the SIB1 in the terminal device, the network device does not need to periodically broadcast the SIB1, thereby effectively reducing consumption of the network device.

The network device sends the first dedicated signaling including the SIB1 to the terminal device at the first moment through the second bandwidth part, which may be specifically based on indication information of the terminal device or based on internal implementation. For details, refer to the following optional implementations.

In a first optional implementation, the network device determines, based on an indication of the terminal device, to send the first dedicated signaling including the SIB1 to the terminal device at a first moment satisfying a preset condition.

Specifically, the terminal device determines, through a timer, duration of the SIB1 stored in the terminal device, and when determining that the duration reaches specified duration of the timer, the terminal device determines whether the SIB1 from the network device can be received through a second bandwidth part. If yes, the SIB1 from the network device is received through the second bandwidth part, or otherwise, indication information is sent to the network device. The indication information specifically indicates the network device to send the SIB1 to the terminal device. The network device receives the indication information, and sends, in response to the indication information, first dedicated signaling including the SIB1 to the terminal device at the first moment.

There are at least the following examples in which the terminal device determines whether the SIB1 from the network device can be received through the second bandwidth part:

Example 1: If determining that the second bandwidth part does not include the frequency domain resource for broadcasting the SIB1 by the network device, the terminal device determines that the frequency domain resource for sending the SIB1 by the network device is not configured on the second bandwidth part. The frequency domain resource for broadcasting the SIB1 by the network device may be determined by the terminal device based on the common search space and the control resource set 0 in the MIB. For details, refer to the foregoing implementation. Details are not described herein again.

Example 2: If the terminal device determines that the second bandwidth part includes the frequency domain resource for broadcasting the SIB1 by the network device, but determines, after listening on the PDSCH resource for first preset duration, that the SIB1 broadcast by the network device cannot be received, the terminal device determines that time domain resource for sending the SIB1 by the network device is not configured on the second bandwidth part. In this application, the first preset duration may be greater than a period for broadcasting the SIB1 by the network device, and the first preset duration may be negotiated by the terminal device and the network device in advance, or may be determined in advance according to a protocol. For example, the period for broadcasting the SIB1 by the network device is 160 ms, a repetition transmission interval is 20 ms, and the first preset duration is 200 ms. Certainly, the period may further be of another value determined based on a network deployment manner.

The terminal device may send the indication information to the network device when determining that duration of the stored SIB1 reaches specified duration. The specified duration may be any duration less than valid duration of the SIB1. To be specific, the terminal device may send the indication information to the network device at any moment before determining that the duration of the stored SIB1 reaches the valid duration of the SIB1. For example, when it is determined that the duration of the stored SIB1 is about to reach the valid duration (it is determined that the stored SIB1 is about to expire), the indication information is sent to the network device. In addition, the terminal device may further send the indication information to the network device under some trigger conditions, for example, when the terminal device determines that an operating bandwidth part is switched from the first bandwidth part to the second bandwidth part, or when the terminal device determines that a service busy rate is less than a busy rate threshold, or at another moment.

The trigger condition is satisfied before the SIB1 in the terminal device expires. In some embodiments, the terminal device may determine, with reference to the trigger condition and the specified duration, to send the indication information to the network device. For example, if the terminal device determines that the trigger condition is satisfied before timing of the timer reaches the specified duration, the terminal device sends the indication information to the network device. If the terminal device determines that the trigger condition has not been satisfied, the terminal device sends the indication information to the network device when timing of the timer reaches the specified duration.

Correspondingly, the network device determines, based on the indication information, a first moment satisfying the preset condition, and sends the first dedicated signaling including the SIB1 to the terminal device at the first moment. The terminal device also determines a first moment satisfying the preset condition, and receives the first dedicated signaling including that is sent by the network device and that includes the SIB1 at the first moment.

The indication information sent by the terminal device to the network device may be first indication information or second indication information. The first indication information may be understood as SIB1 reminder information. The first indication information reminds the network device that the SIB1 stored in the terminal device is about to expire, and the network device needs to immediately send the first dedicated signaling including the SIB1 to the terminal device. The second indication information indicates an expiration moment of the SIB1 stored in the terminal device, and the network device needs to send the first dedicated signaling including the SIB1 to the terminal device before the expiration moment. For details, refer to the following embodiments.

Figure 3:
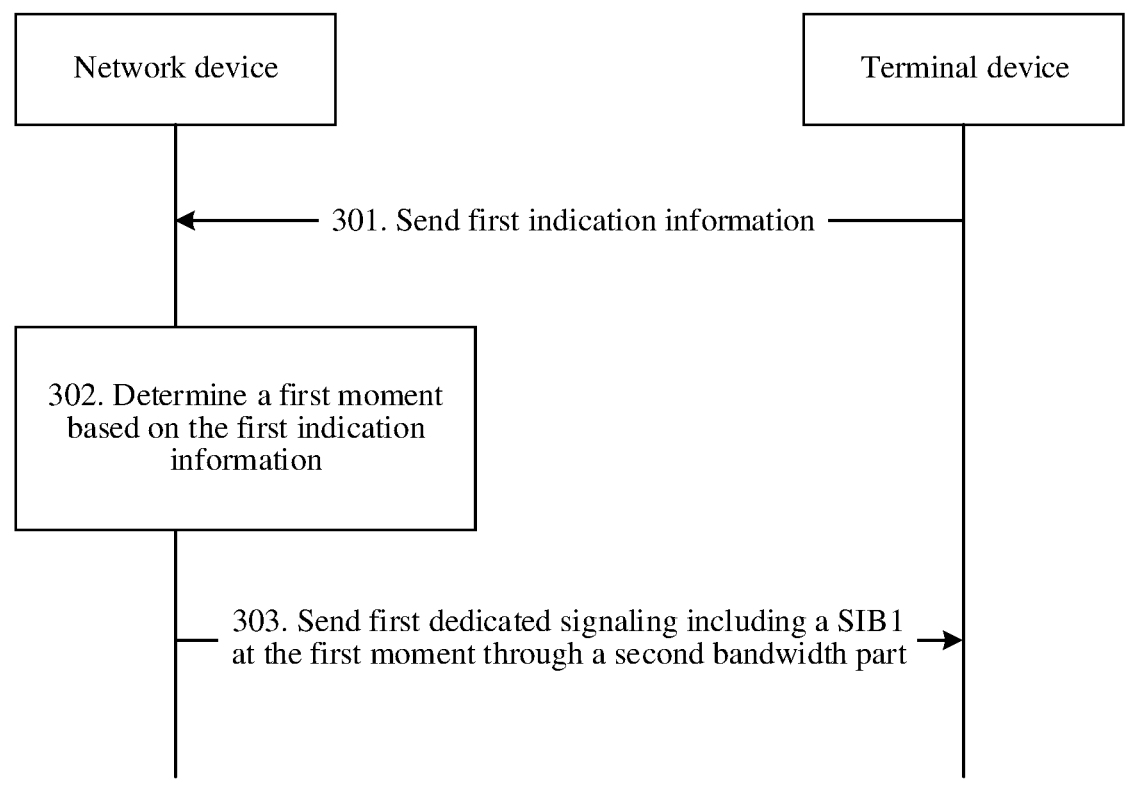
FIG. 3 is a first schematic flowchart of sending a SIB1 by a network device according to this disclosure.

FIG. 3 is a first schematic flowchart of an example of sending a SIB1 by a network device. A procedure is as follows:

Step 301. A terminal device sends first indication information to a network device.

When determining that, through a timer, that duration of the SIB1 stored in the terminal device reaches specified duration (which may be referred to as second preset duration), the terminal device determines that the SIB1 stored in the terminal device is about to expire. In this application, the second preset duration may be negotiated by the terminal device and the network device in advance, or may be determined in advance according to a protocol. For example, valid duration of the SIB1 is 3 h, and the second preset duration is 2.9 h. When determining that the duration of the stored SIB1 reaches 2.9 h, the terminal device sends first indication information to the network device. In this case, remaining valid duration of the stored SIB1 in the terminal device is 0.1 h.

Step 302. The network device determines a first moment based on the first indication information.

The network device receives the first indication information, and determines the first moment based on the first indication information. The first moment is a moment within third preset duration after the network device receives the first indication information.

The third preset duration is less than the remaining valid duration of the stored SIB1 in the terminal device, to ensure that the terminal device receives first dedicated signaling including the SIB1 from the network device before deleting the SIB1. The third preset duration may be negotiated by the terminal device and the network device in advance, or may be determined in advance according to a protocol.

Step 303. The network device sends first dedicated signaling including the SIB1 to the terminal device at the first moment through a second bandwidth part.

In the foregoing technical solution, the terminal device maintains the timer to determine the duration of the SIB1 stored in the terminal device. If the terminal device cannot receive the SIB1 through the second bandwidth part, the terminal device sends the first indication information to the network device when the timer reaches the second preset duration. The network device determines, based on the first indication information, to immediately send the first dedicated signaling including the SIB1 to the terminal device. The terminal device receives the first dedicated signaling, and obtains the SIB1 from the first dedicated signaling, so as to periodically update the stored SIB1.

Figure 4:
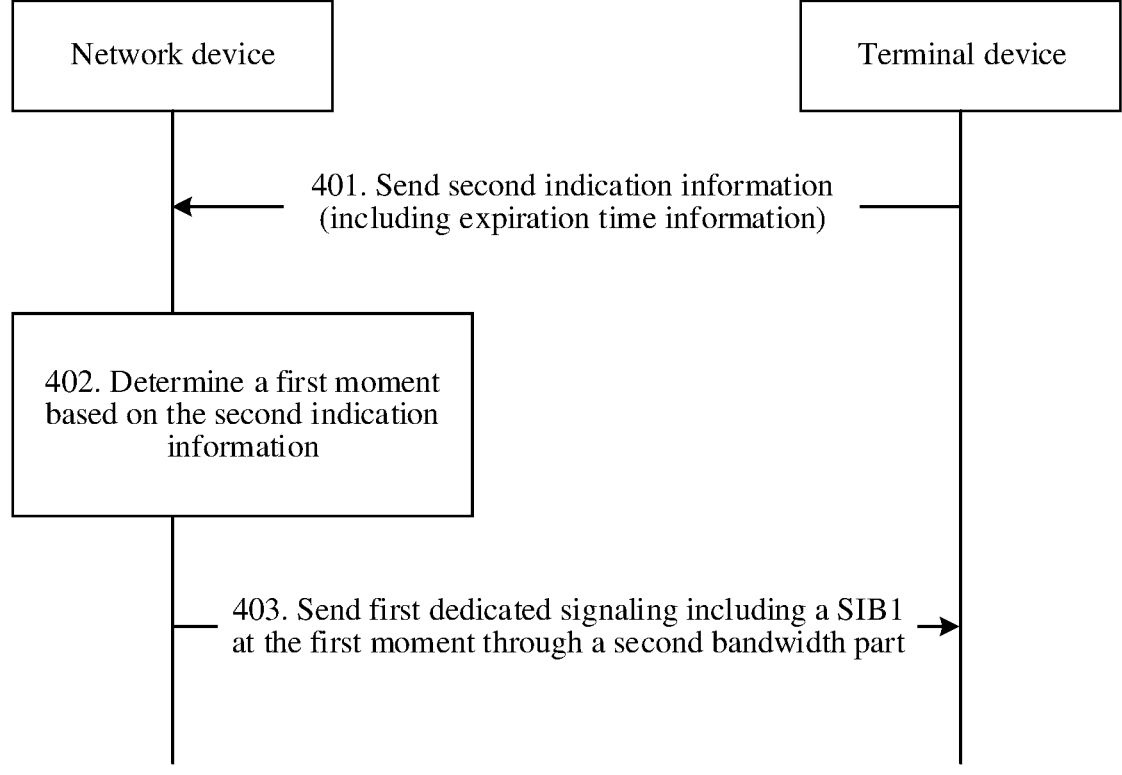
FIG. 4 is a second schematic flowchart of sending a SIB1 by a network device according to this disclosure.

FIG. 4 is a second schematic flowchart of an example of sending a SIB1 by a network device. A procedure is as follows:

Step 401. A terminal device sends second indication information to a network device.

The terminal device sends the second indication information to the network device when determining, through a timer, that duration of the SIB1 stored in the terminal device reaches specified duration (which may be referred to as fourth preset duration), or some foregoing trigger conditions (where bandwidth is switched, a service busy rate is less than a busy rate threshold, and the like) are satisfied.

The second indication information includes expiration time information. The expiration time information indicates an expiration moment of the SIB1 stored in the terminal device. The expiration time information is, for example, an expiration moment determined by the terminal device, or duration of the SIB1 stored in the terminal device, or remaining valid duration of the SIB1 stored in the terminal device.

Step 402. The network device determines a first moment based on the second indication information.

The network device receives the second indication information, and determines the first moment based on the expiration time information in the second indication information. The first moment is before the expiration moment.

Step 403. The network device sends first dedicated signaling including the SIB1 to the terminal device at the first moment through a second bandwidth part.

In a specific implementation, the second indication information includes a second moment, where the second moment is an expiration moment of the SIB1 stored in the terminal device. The network device determines the first moment before the second moment, and then sends the first dedicated signaling including the SIB1 to the terminal device at the first moment through the second bandwidth part.

For example, valid duration of the SIB1 is 3 hours. The terminal device receives the SIB1 from the network device at 10:00, and starts a timer to perform timing. The terminal device determines that the second moment is 13:00, and in this case, the terminal device may send the second indication information to the network device before 13:00 (for example, at 12:00). The second indication information includes the second moment 13:00. Correspondingly, after receiving the second indication information, the network device may send the first dedicated signaling including the SIB1 to the terminal device at any moment (that is, the first moment, for example, 12:50) before the second moment 13:00.

In the foregoing technical solution, the terminal device may determine to send the second indication information to the network device at any moment before the duration of the stored SIB1 reaches the valid duration. For example, when determining that the duration of the stored SIB1 is about to reach the valid duration, or the first bandwidth part is switched to the second bandwidth part, or a service busy rate is less than a busy rate threshold, correspondingly, the network device may also determine, based on the expiration time information in the second indication information, to send the first dedicated signaling including the SIB1 to the terminal device at any moment before the duration reaches the valid duration, thereby improving flexibility for the terminal device to obtain the SIB1 while ensuring that the terminal device periodically updates the stored SIB1.

In addition, the network device may further determine the first moment, and then send the first dedicated signaling including the SIB1 to the terminal device at the first moment. The following is an example of a second implementation provided in this application.

Figure 5:
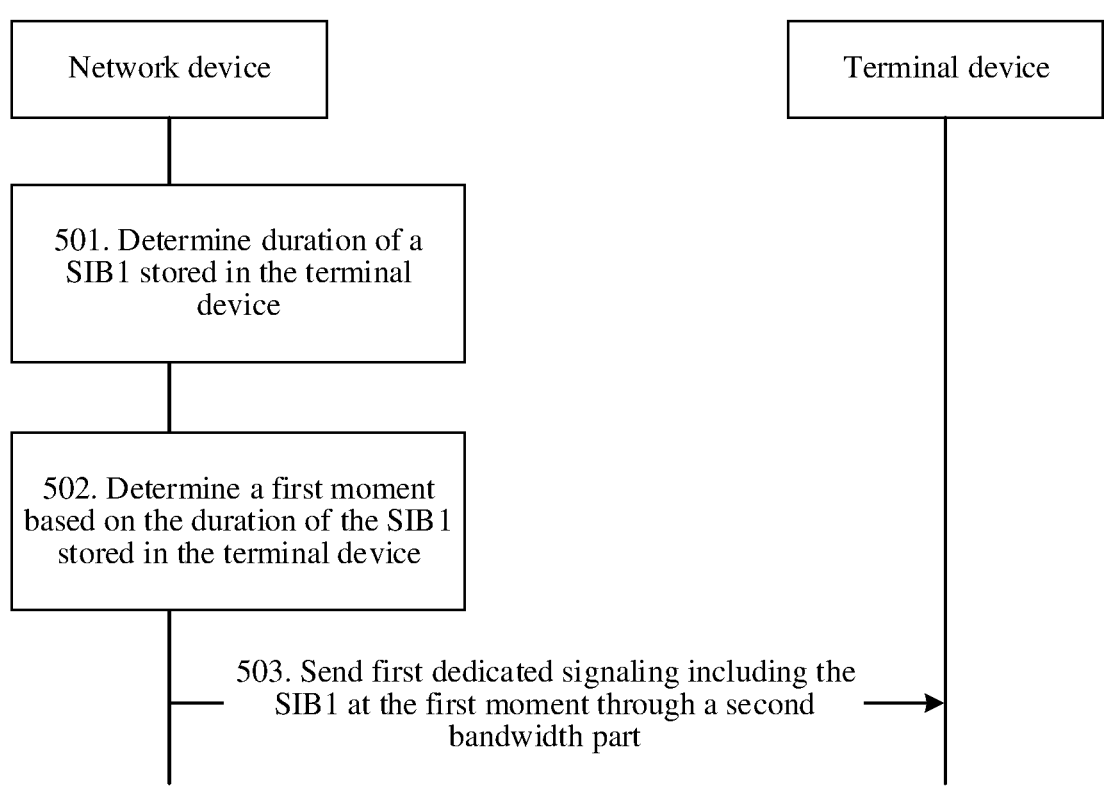
FIG. 5 is a third schematic flowchart of sending a SIB1 by a network device according to this disclosure.

FIG. 5 is a third schematic flowchart of an example of sending a SIB1 by a network device. A procedure is as follows:

Step 501. A network device determines duration of a SIB1 stored in a terminal device.

The network device determines whether the terminal device can receive the SIB1 through a second bandwidth part. Specifically, the network device may determine whether configuration information for sending the SIB1 is configured on the second bandwidth part. For example, the network device determines configuration information of a frequency domain resource for broadcasting the SIB1. If determining that the second bandwidth part does not include the frequency domain resource for broadcasting the SIB1 by the network device, it is determined that the terminal device cannot receive the SIB1 through the second bandwidth part. In another example, if the network device determines not to broadcast the SIB1 in a period of time, the terminal device cannot receive the SIB1 in the period of time.

If determining that the terminal device cannot receive the SIB1 through the second bandwidth part, the network device actively starts timing, and sends the first dedicated signaling including the SIB1 to the terminal device when determining that duration of the stored SIB1 in the terminal device reaches specified duration. The specified duration herein may be any duration less than the valid duration of the SIB1. In embodiments of this application, the network device needs to first determine a moment at which the terminal device receives the SIB1 before further starting the timing.

In an example, after step 201, the network device sends second dedicated signaling including a SIB1 to the terminal device. If the terminal device successfully receives the SIB1 through the second dedicated signaling, the terminal device stores the received SIB1 and sends an acknowledgement (ACK) to the network device. The network device receives the ACK, and determines, based on a moment of sending the second dedicated signaling, a moment at which the terminal device receives the SIB1. The network device starts timing at the moment at which the terminal device receives the SIB1, and determines duration of the stored SIB1 in the terminal device. The second dedicated signaling may be RRC dedicated signaling.

It should be understood that before sending the first dedicated signaling to the terminal device, the network device sends the second dedicated signaling to the terminal device, where the second dedicated signaling is different from the first dedicated signaling. In some embodiments, after sending the first dedicated signaling (including the SIB1) to the terminal device, the network device starts a timer, and when determining that the duration of the stored SIB1 in the terminal device reaches the specified duration, the network device sends third dedicated signaling including the SIB1 to the terminal device. In this case, the first dedicated signaling may be understood as the second dedicated signaling, and the third dedicated signaling may be understood as the first dedicated signaling.

In still another example, after step 201, in a random access channel (random access channel, RACH) process, the terminal device requests a SIB1 of a current cell from the network device. If the SIB1 of the current cell is successfully requested, the requested SIB1 is stored, and an ACK is sent to the network device. The network device receives the ACK, and determines, based on a moment at which the terminal device establishes an RRC connection to the terminal device, a moment at which the terminal device receives the SIB1. The network device starts timing based on the moment at which the terminal device receives the SIB1, and determines duration of storing the SIB1 in the terminal device.

Step 502. The network device determines a first moment based on duration of the SIB1 stored in the terminal device.

The first moment is a moment before duration of the SIB1 stored in the terminal device reaches the valid duration.

Step 503. The network device sends first dedicated signaling including the SIB1 to the terminal device at the first moment through a second bandwidth part.

It should be noted that, in step 501 to step 503, the network device starts the timer, and the timer corresponds to the specified duration. When determining that duration of the stored SIB1 in the terminal device reaches the specified duration of the timer, the network device determines a first moment satisfying a preset condition. In this case, the first moment may be after duration of the SIB1 stored in the terminal device reaches the specified duration and before the expiration moment.

In addition, when determining that the trigger condition is satisfied, the network device may further send the first dedicated signaling including the SIB1 to the terminal device. For the trigger condition herein, refer to descriptions in the foregoing embodiment, and details are not described again.

The terminal device may start or not start the timer. That is, in this embodiment, step 202 is an optional step.

In the foregoing technical solution, if determining that the terminal device cannot receive the system information block through the second bandwidth part, the network device actively maintains the timer to determine duration of the stored system information block in the terminal device. Before determining that the duration reaches the valid duration based on the timer, the network device sends the first dedicated signaling including the system information block to the terminal device, and the terminal device receives the first dedicated signaling and obtains the system information block from the first dedicated signaling, so as to periodically update the stored system information block. Further, the terminal device does not need to determine whether broadcast of the network device may be received, or the terminal device does not need to start the timer, thereby reducing complexity of the terminal device.

This disclosure further provides the following third implementation. Before the duration of the SIB1 stored in the terminal device reaches the valid duration, if determining that the configuration information for sending the SIB1 by the network device is not configured on the second bandwidth part, a currently stored SIB1 may continue to be used. This avoids a problem that the terminal device mistakenly considers that the current cell is barred because the terminal device deletes the stored SIB1.

In the implementation, the terminal device receives the SIB1 from the network device through the first bandwidth part, stores the SIB1, and starts the timer (which may be referred to as a first timer herein). Timing duration of the first timer is specified duration, and the specified duration is less than the valid duration of the SIB1.

The terminal device determines the duration of the SIB1 stored in the terminal device through the first timer. When determining that the duration reaches the specified duration, the following example 1 to example 3 may be specifically provided, which helps to avoid a problem that the terminal device cannot work normally in a current cell due to deleting the SIB1, thereby improving communication reliability.

Example 1: When the terminal device restarts a first timer, in this case, duration of the SIB1 stored in the terminal device determined by the first timer is zero. Further, the terminal device continues to determine the duration of the SIB1 stored in the terminal device through the first timer. Optionally, the terminal device further includes a counter, configured to determine a quantity of times of restarting the first timer. After determining that the quantity of times of restarting the first timer reaches a preset quantity of times, the terminal device deletes the SIB1 stored in the terminal device.

Example 2: The terminal device prolongs valid duration of the stored system information block, which is equivalent to that the terminal device continues to use the first timer to determine the duration of the SIB1 stored in the terminal device. Optionally, fifth preset duration of the stored SIB1 may be set in the terminal device, and the duration of the stored SIB1 in the terminal device does not exceed the fifth preset duration.

Example 3: The terminal device starts a second timer, and uses the second timer to determine the duration of the SIB1 stored in the terminal device. Optionally, timing duration of the second timer is different from timing duration of the first timer. For example, the timing duration of the first timer is 3 h, and the timing duration of the second timer is 6 h.

In the implementation, the SIB1 sent by the network device to the terminal device through the first bandwidth part may be referred to as a first SIB1. If determining that the system information of the current cell changes, the network device broadcasts a system information change indication. The system information change indication indicates the terminal device in the current cell to obtain a new SIB1 (a SIB1 after the system information changes). The new SIB1 may be referred to as a second SIB1, and a parameter in the second SIB1 is different from a parameter in the first SIB1.

Figure 6:
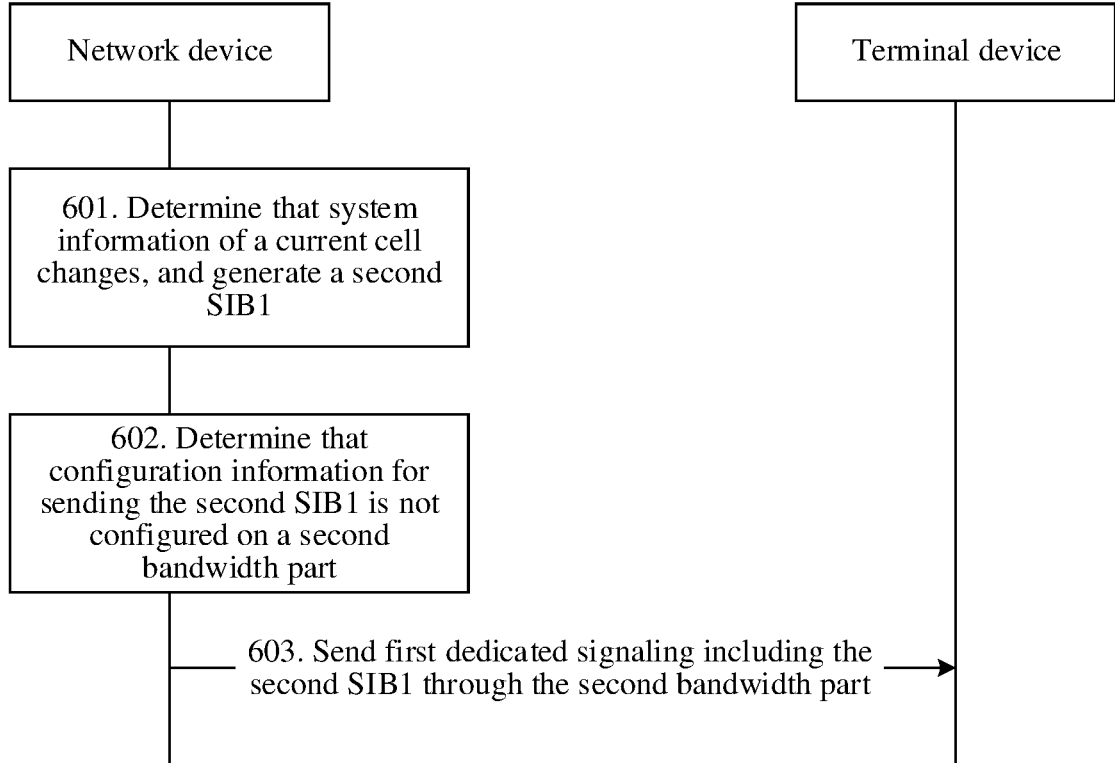
FIG. 6 is a fourth schematic flowchart of sending a SIB1 by a network device according to this disclosure.

FIG. 6 is an example of a schematic flowchart of sending a SIB1 by a fourth network device. In the procedure:

Step 601. A network device determines that system information of a current cell changes, and generates a second SIB1.

Step 602. The network device determines that configuration information for sending the second SIB1 is not configured on a second bandwidth part.

That is, configuration information of the second bandwidth part does not include the configuration information for sending the second SIB1 by the network device. Even if the network device broadcasts the second SIB1, because the network device does not configure the configuration information for sending the second SIB1 on the second bandwidth part, a terminal device operating on the second bandwidth part cannot receive the second SIB1.

Step 603. The network device sends first dedicated signaling including the second SIB1 to the terminal device through the second bandwidth part. Correspondingly, the terminal device receives the first dedicated signaling from the network device, replaces a currently stored first SIB1 with the second SIB1 in the first dedicated signaling, and restarts a first timer.

In the foregoing technical solution, if the terminal device determines that the SIB1 cannot be received through the second bandwidth part, when the duration of the stored SIB1 in the terminal device reaches the valid duration, the terminal device continues to use the stored SIB1 until an updated SIB1 sent by the network device through the first dedicated signaling is received. This avoids a problem that the terminal device cannot work normally in the current cell due to deleting the SIB1, thereby improving communication reliability.

Although the SIB1 is used as an example in the foregoing embodiment, this disclosure is also applicable to OSI, for example, any one of SIB2, . . . , and SIB14. If the system information block is the OSI, the network device and/or the terminal device may determine, based on the SIB1, whether a time domain resource and/or a frequency domain resource for sending the OSI by the network device are/is configured on the second bandwidth part, and perform the process of obtaining the system information block in the foregoing embodiment.

This application provides an example of an actual application scenario. The actual application scenario includes one network device and three video surveillance devices. The three video surveillance devices may access a serving cell provided by the network device. Due to particularity of a surveillance service provided by the video surveillance device, the video surveillance device may be in the RRC connected state for a long time. For any video surveillance device, the network device schedules the video surveillance device from an initial bandwidth part to an active bandwidth part, where configuration information for sending the SIB1 by the network device may not be configured on the active bandwidth part. In this case, the video surveillance device may continue to use a SIB1 received on the initial bandwidth part, until the first dedicated signaling including the SIB1 from the network device is received through the active bandwidth part.

Embodiments described in this specification may be independent solutions, or may be combined based on internal logic. All these solutions fall within the protection scope of this application.

It may be understood that, in the foregoing method embodiments, methods and operations implemented by the terminal device may further be implemented by a component (for example, a chip or a circuit) that may be used in the terminal device, and methods and operations implemented by the network device may further be implemented by a component (for example, a chip or a circuit) that may be used in the network device.

In the foregoing embodiments provided in this application, the methods provided in embodiments of this application are separately described from a perspective of interaction between devices. To implement functions in the methods provided in embodiments of this application, the terminal device and the network device may include a hardware structure and/or a software module, and implement the foregoing functions in a form of the hardware structure, the software module, or a combination of the hardware structure and the software module. Whether a function in the foregoing functions is performed through the hardware structure, the software module, or the combination of the hardware structure and the software module depends on a specific application and a design constraint condition of the technical solution.

The module division in embodiments of this application is an example, and is merely logical function division. There may be another division manner in an actual implementation. In addition, functional modules in embodiments of this application may be integrated into one processor, or may exist alone physically, or two or more modules are integrated into one module. The foregoing integrated module may be implemented in a form of hardware, or may be implemented in a form of a software function module.

Figure 7:
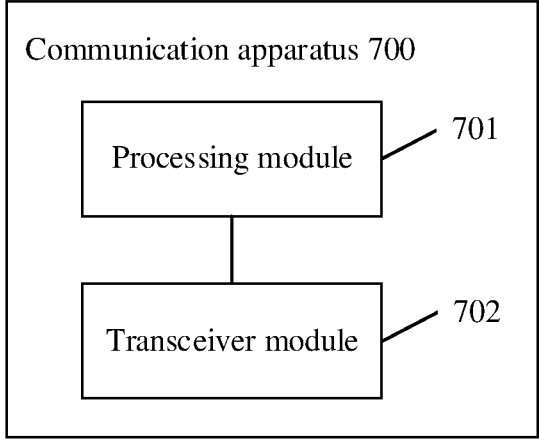
FIG. 7 is a schematic diagram of a structure of a communication apparatus according to this disclosure.
Figure 8:
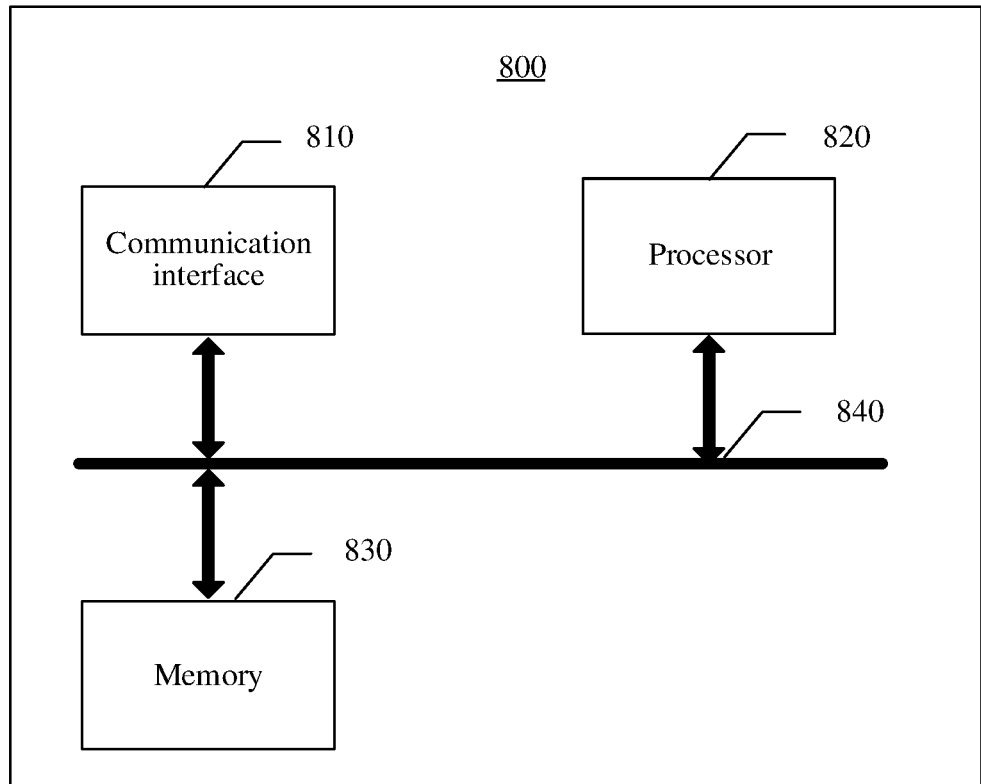
FIG. 8 is a schematic diagram of a structure of another communication apparatus according to this disclosure.

Based on the foregoing content and a same concept, FIG. 7 and FIG. 8 are schematic diagrams of structures of possible communication apparatuses according to this application. These communication apparatuses may be configured to implement functions of the terminal device or the network device in the foregoing method embodiments, and therefore may also implement beneficial effects of the foregoing method embodiments.

As shown in FIG. 7, the communication apparatus 700 includes a processing module 701 and a transceiver module 702. The communication apparatus 700 is configured to implement a function of the network device or a function of the terminal device in embodiments related to FIG. 2 to FIG. 6.

For example, the communication apparatus 700 may be a network device, or may be a chip used in the network device, or another combined component, or component that has a function of the foregoing network device. The communication apparatus 700 may further be a terminal device, or may be a chip used in the terminal device, or another combined component, or component that has a function of the foregoing terminal device.

For example, when the communication apparatus 700 is a network device, the transceiver module 702 may be a transceiver. The transceiver may include an antenna, a radio frequency circuit, and the like, and the processing module 701 may be a processor (or a processing circuit), for example, a baseband processor. The baseband processor may include one or more CPUs. When the communication apparatus 700 is a component having a function of the foregoing network device, the transceiver module 702 may be a radio frequency unit, and the processing module 701 may be a processor (or a processing circuit), for example, a baseband processor. When the communication apparatus 700 is a chip system, the transceiver module 702 may be an input/output interface of a chip (for example, a baseband chip), and the processing module 701 may be a processor (or a processing circuit) of the chip system, and may include one or more central processing modules. It should be understood that the processing module 701 in embodiments of this application may be implemented by a processor or a processor-related circuit component (or referred to as a processing circuit), and the transceiver module 702 may be implemented by a transceiver or a transceiver-related circuit component.

FIG. 8 is a communication apparatus 800 according to an embodiment of this application. The communication apparatus shown in FIG. 8 may be an implementation of a hardware circuit of the communication apparatus shown in FIG. 7. The communication apparatus is applicable to the foregoing flowchart, and performs a function of the terminal device or the network device in the foregoing method embodiment.

For ease of description, FIG. 8 shows only main components of the communication apparatus. The communication apparatus 800 shown in FIG. 8 includes at least one processor 820, configured to implement any one of the methods in FIG. 2 to FIG. 6 provided in embodiments of this application.

The communication apparatus 800 may further include at least one memory 830, configured to store program instructions and/or data. The memory 830 is coupled to the processor 820. The coupling in embodiments of this application is an indirect coupling or a communication connection between apparatuses, units, or modules, and may be in an electrical, mechanical, or another form, and is used for information exchange between the apparatuses, units, or modules. The processor 820 may cooperate with the memory 830. The processor 820 may execute program instructions stored in the memory 830. At least one of the at least one memory may be included in a processor.

The communication apparatus 800 shown in FIG. 8 includes at least one processor 820 and a communication interface 810. The processor 820 is configured to execute instructions or a program stored in the memory 830. When the instructions or the program stored in the memory 830 is executed, the processor 820 is configured to perform an operation performed by the processing module 701 in the foregoing embodiment, and the communication interface 810 is configured to perform an operation performed by the transceiver module 702 in the foregoing embodiment.

In embodiments of this application, the communication interface may be a transceiver, a circuit, a bus, a module, or another type of communication interface. In embodiments of this application, when the communication interface is the transceiver, the transceiver may include an independent receiver and an independent transmitter, or may be a transceiver integrated with a transceiver function or a communication interface.

The communication apparatus 800 may further include a communication line 840. The communication interface 810, the processor 820, and the memory 830 may be connected to each other through the communication line 840. The communication line 840 may be a peripheral component interconnect (PCI) bus, an extended industry standard architecture (EISA) bus, or the like. The communication line 840 may be classified into an address bus, a data bus, a control bus, and the like. For ease of representation, only one bold line is used in FIG. 8 for representation, but which does not indicate that there is only one bus or only one type of bus.

Based on the foregoing content and a same concept, this application provides a communication apparatus, including a processor and a communication interface. The communication interface is configured to receive a signal from another communication apparatus other than the communication apparatus and transmit the signal to the processor, or send a signal from the processor to another communication apparatus other than the communication apparatus. The processor is configured to implement, by using a logic circuit or by executing code instructions, a function of the network device or a function of the terminal device in the method embodiments shown in FIG. 2 to FIG. 6.

Based on the foregoing content and a same concept, this application provides a computer-readable storage medium. The computer readable storage medium stores a computer program or instructions. When the computer program or the instructions are executed by a communication apparatus, a function of the network device or a function of the terminal device in the method embodiments shown in FIG. 2 to FIG. 6 is implemented.

Based on the foregoing content and a same concept, this application provides a computer program product. The computer program product includes a computer program or instructions. When the computer program or the instructions are executed by a communication apparatus, a function of the network device or a function of the terminal device in the method embodiments shown in FIG. 2 to FIG. 6 is implemented.

Based on the foregoing content and a same concept, this application provides a communication system, including the network device in the method embodiments shown in FIG. 2 to FIG. 6 and the terminal device in the method embodiments shown in FIG. 2 to FIG. 6.

Based on the foregoing content and a same concept, this application provides a chip, including at least one processor and an interface.

The interface is configured to provide program instructions or data for the at least one processor.

The at least one processor is configured to execute the program instructions, to implement a function of the network device or a function of the terminal device in the method embodiments shown in FIG. 2 to FIG. 6.

In this application, "at least one" refers to one or more, and "a plurality of" refers to two or more. "At least one of the following" or a similar expression thereof refers to any combination of these items, including one item or any combination of a plurality of items. For example, at least one of a, b, or c may indicate a, b, c, "a and b", "a and c", "b and c", or "a and b and c", where a, b, and c may be singular or plural. "And/or" describes an association relationship of associated objects, and indicates that three relationships may exist. For example, A and/or B may indicate that only A exists, both A and B exist, and only B exists, where A and B may be singular or plural. In a text description of this application, the character "/" generally indicates that the associated objects are in an "or" relationship. In a formula of this application, the character "/" indicates that the associated objects are in a "division" relationship.

It may be understood that various numerical numbers in embodiments of this application are merely distinguished for ease of description, and are not intended to limit the scope of embodiments of this application. Sequence numbers of the foregoing processes do not indicate an execution sequence, and the execution sequence of the processes should be determined based on functions and internal logic thereof.

Persons skilled in the art may make various modifications and variations to this specification without departing from the protection scope of this disclosure, all of which are encompassed within the scope of the accompanying claims.

The invention claimed is:

1. A system information block transmission method, comprising:
   sending, by a network device, a system information block to a terminal device through a first bandwidth part;
   sending, by the network device to the terminal device through a second bandwidth part, the system information block when determining that a first moment satisfying a preset condition has been attained, wherein:
   the system information block is included in first dedicated signaling;
   configuration information for sending the system information block by the network device is not configured on the second bandwidth part; and
   the determining that a first moment satisfying a preset condition has been attained comprises:
      receiving, by the network device from the terminal device, first indication information indicating that the system information block stored in the terminal device is about to expire; and
      determining, by the network device, the first moment based on the first indication information.

2. The method according to claim 1, wherein the determining that a first moment satisfying a preset condition has been attained comprises:
   receiving, by the network device from the terminal device, second indication information comprising a second moment including an expiration moment of the system information block stored in the terminal device; and
   determining, by the network device, the first moment based on the second indication information, wherein the first moment precedes in time the second moment.

3. The method according to claim 1, wherein the determining that a first moment satisfying a preset condition has been attained comprises:
   starting, by the network device, timing for a specified duration from a moment at which the network device establishes a radio resource control connection to the terminal device, wherein the first moment follows expiration of the specified duration.

4. The method according to claim 1, wherein the determining that a first moment satisfying a preset condition has been attained comprises:
   starting, by the network device, timing for a specified duration from a moment at which the network device sends the system information block to the terminal device through second dedicated signaling, wherein the first moment follows expiration of the specified duration.

5. The method according to claim 1, wherein the configuration information for sending the system information block comprises:
   a frequency domain resource for broadcasting the system information block by the network device, wherein the second bandwidth part does not comprise the frequency domain resource.

6. The method according to claim 1, wherein the second bandwidth part is the same as the first bandwidth part.

7. A system information block transmission method, comprising:
   receiving, by a terminal device from a network device through a first bandwidth part, a system information block;
   storing, by the terminal device, the system information block and starting a timer, wherein the timer is set to run for a specified duration;
   receiving, by the terminal device from the network device through a second bandwidth part, the system information block when the timer expires, wherein the system information block is included in first dedicated signaling, and configuration information for sending the system information block by the network device is not configured on the second bandwidth part; and
   sending, by the terminal device to the network device, first indication information when the timer expires, wherein the first indication information indicates that the system information block stored in the terminal device is about to expire.

8. The method according to claim 7, further comprising:
   sending, by the terminal device, second indication information to the network device when the timer expires, wherein the second indication information comprises a second moment including an expiration moment of the system information block stored in the terminal device.

9. The method according to claim 7, wherein the configuration information for sending the system information block comprises:
   a frequency domain resource for broadcasting the system information block by the network device, and the second bandwidth part does not comprise the frequency domain resource.

10. The method according to claim 7, wherein the second bandwidth part is the same as the first bandwidth part.

11. A communication apparatus, comprising:
   a non-transitory memory storage comprising instructions; and
   one or more processors in communication with the memory storage, wherein the instructions, when executed by the one or more processors, cause the communication apparatus to:

send a system information block to a terminal device through a first bandwidth part, wherein:

when determining that a first moment satisfying a preset condition has been attained, send the system information block to the terminal device through a second bandwidth part, wherein the system information block is included in first dedicated signaling, and configuration information for sending the system information block by the network device is not configured on the second bandwidth part; and wherein:

determining that a first moment satisfying a preset condition is reached comprises:

receive first indication information from the terminal device, wherein the first indication information indicates that the system information block stored in the terminal device is about to expire; and determine the first moment based on the first indication information.

12. The communication apparatus according to claim 11, wherein determining that a first moment satisfies a preset condition has been attained comprises:

receiving from the terminal device second indication information comprising a second moment including an expiration moment of the system information block stored in the terminal device; and determining the first moment based on the second indication information, wherein the first moment precedes in time the second moment.

13. The communication apparatus according to claim 11, wherein determining that a first moment satisfies a preset condition has been attained comprises:

starting timing for a specified duration from a moment at which the communication apparatus establishes a radio resource control connection to the terminal device, wherein the first moment follows expiration of the specified duration.

14. The communication apparatus according to claim 11, wherein determining that a first moment satisfies a preset condition has been attained comprises:

starting timing for specified duration from a moment at which the communication apparatus sends the system information block to the terminal device through second dedicated signaling, wherein the first moment follows expiration of the specified duration.

15. A communication apparatus, comprising:

a non-transitory memory storage comprising instructions; and one or more processors in communication with the memory storage, wherein the instructions, when executed by the one or more processors, cause the communication apparatus to:

receive a system information block from a network device through a first bandwidth part;

store the system information block and start a timer, wherein the timer is set to run for a specified duration;

receive the system information block from the network device through a second bandwidth part when the timer expires, wherein the system information block is included in first dedicated signaling, and configuration information for sending the system information block by the network device is not configured on the second bandwidth part; and send first indication information to the network device when the timer expires, wherein the first indication information indicates that the system information block stored in the terminal device is about to expire.

16. The communication apparatus according to claim 15, wherein the instructions, when executed by the one or more processors, cause the communication apparatus to send second indication information to the network device when the timer expires, wherein the second indication information comprises a second moment including an expiration moment of the system information block stored in the terminal device.

* * * * *